3,205,057
METHOD AND MEANS FOR THE REMOVAL OF GLASS ARTICLES FROM A MOULD

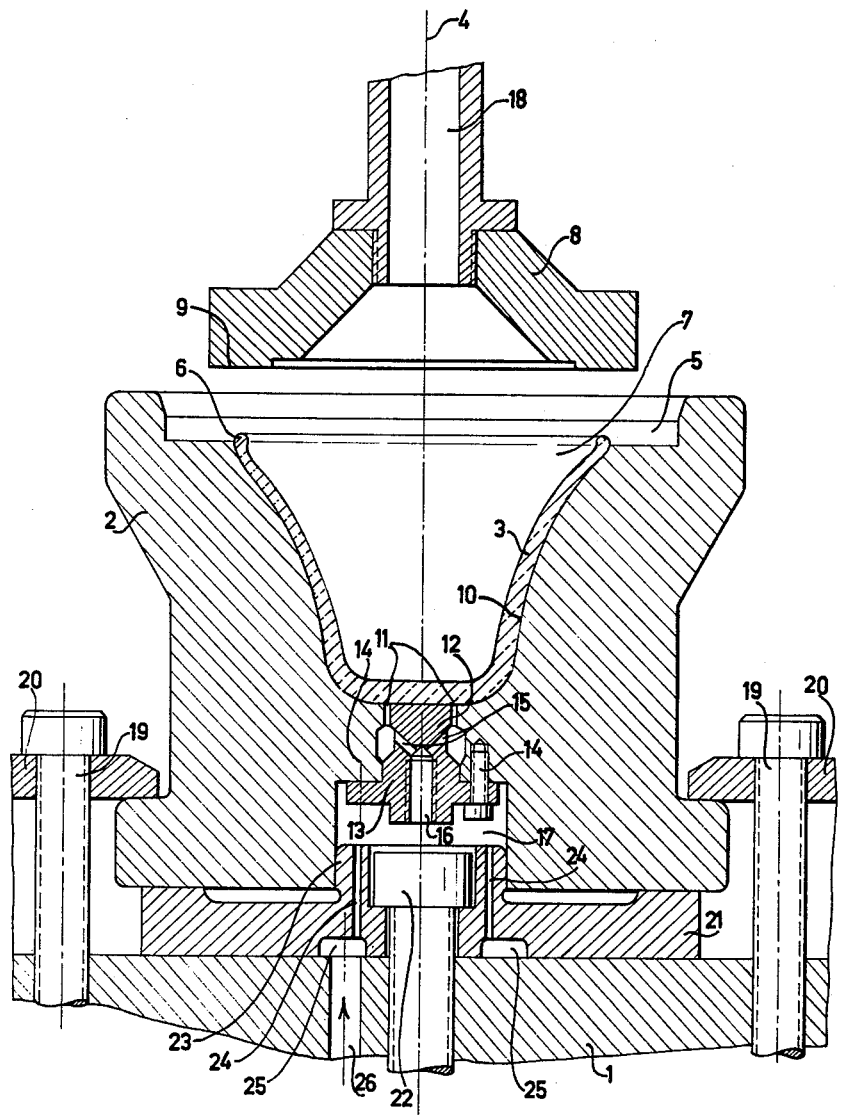

Emil Jan Johan Benard and Gerrit Leeuw, Leerdam, Netherlands, assignors to N.V. Vereenigde Glasfabrieken (United Glassworks), Schiedam, Netherlands, a company of the Netherlands
Filed Sept. 12, 1961, Ser. No. 137,630
Claims priority, application Netherlands, Sept. 13, 1960, 255,861
2 Claims. (Cl. 65—84)

The invention relates to an improved method and a device for the removal of glass articles from a mould.

Heretofore, for example, as disclosed in British patent specification 230,276, in order to remove a glass article from a mould, a suction device is applied to the entrance side of the mould and, at the same time, the bottom of the article is raised by means of a piston rod which is introduced at the bottom side of the mould. However, such means can only be brought into action upon the glass article when the glass is sufficiently solidified during a cooling down period within the mould wherein the article has been shaped from a molten glass bud by means of a pressing cone which is introduced into the entrance side of the mould.

In practice this solidification or setting starts with the formation of a thin film at the surface of the article contacting the wall of the mould. In a mechanized process it is desirable, in order to save time to initiate the removal of the article immediately after this film has formed and before such rigidity has been obtained as to permit a mechanic expulsion device to be used thereon.

It is a main object of the present invention to obtain such early removal of the glass article from the mould.

In accordance with the method embodying the present invention, use is made of the insight that, after the object has stayed for about 5 seconds in the mould, the surface of the object contacting the mould has already solidified to such extent that the article can be lifted by a layer of air introduced under this surface. Owing to the setting or solidifying of the article at the surface layer thereof, there appears also a certain shrinkage, whereby it is possible to pass air between the surfaces of the article and the mould.

It is a further object of the invention to provide a mould wherein thin-walled articles, for example, the body of a chalice, can be pressed and removed from the mould soon after pressing, in such a way that the time, which otherwise would be required to complete the solidification of the article before knocking out the same, can be used for the removal from the mould and transport.

An illustrative embodiment of the invention is hereinafter described in detail with reference to the accompanying drawing which shows an axial cross-sectional view thereof.

The plate of a table is indicated at 1, and has a press mould 2 positioned thereon. In the cavity of the mould there is shown the glass body 3 of a chalice which in a preceding phase of operation has been moulded from a quantity of glass by a pressing cone (not shown) moved into the mould 2 in the direction of the axis 4. A bead edge 6 is also formed on the body 3 by a moulding ring (not shown), which was disposed in the mouth 5 of the mould 2, said edge 6 protruding upwardly from the mold 2. At the conclusion of the moulding operation, a suction plate 8 is moved to a position confronting the opening or mouth of the glass body 3. The suction plate has an annular edge 9 which can be engaged with the edge of the body 3 or can be held at a small distance therefrom.

The time required in order to remove the pressing cone from the cavity 7 and the moulding ring from the mouth 5 and to move the suction plate 8 to the illustrated position is sufficient for the setting of the article at the surface 10, where the glass body 3 is in contact with the mould 2. In the bottom of the mould 2 are one or more air ports 11 which may be constituted by a ring of apertures or by an annular slot defined between the head 12 of the insert 13 and the wall of a mould 2 in which the insert 13 is secured by means of bolts 14. These air ports 11 are connected by way of bores 15 and 16 in insert 12, with a cavity 17 of the mould which together with the aforementioned bores forms part of a duct for compressed air.

When suction is applied to the glass article by way of the conduit 18 opening within the suction plate 8 and a blast of compressed air is simultaneously delivered through ports 11 to act under the article 3, it appears that the article, which substantially is still in a soft state, is perfectly uniformly released from the mold 2 and adheres to the suction plate without any danger of deformation. By lifting and lateral displacement of the suction plate 8 relative to mould 2 the article is raised from the mold and moved to a holder, e.g. a small receptacle (counter punch) of a so called burning in table for a next treatment. The release of the article 3 from suction plate 8 can be effected merely by interrupting the vacuum in the conduit or duct 18 of the suction plate or by introducing compressed air into conduit 18.

The suction plate therefore serves for the transfer of the article from one treating device to another and thus the mechanization of the manufacture of moulded, particularly hollow, glass ware of high quality is considerably improved, as there is no delay between successive operational phases and no need to await solidification of the article in the mold sufficient to permit the same to be mechanically knocked out of the mould. The removal of the article as described above is always possible within a fixed period of only several seconds after moulding and with such reliability that the breakage and waste associated with previously known methods of knocking out can be avoided. The speed with which successive operational phases are performed can be increased to a maximum because the time required for the removal of the moulding ring and the pressing cone after moulding and for the positioning of the suction plate 8 instead thereof is often sufficient to allow for the degree of solidification of the article required for the transfer of the article through the means according to the invention, whereby such tranfer can immediately take place.

Although for the sake of simplicity reference is made to a suction plate which is capable of movement with respect to the mould, this must be understood to be a relative movement. In practice, the mould 2 is laterally moved together with the table 1 from a position in alignment with the axis of the pressing cone to a position aligned with the axis 4 along which the suction plate 8 is arranged for executing an up- and downward movement.

In the illustrated embodiment, the press mould 2 on the table 1 is clamped on an adjusting stock 21 by means of the bolts 19 and lips 20, and the stock 21 is centered with respect to the axis 4 by means of a bolt 22. The top of the bolt 22 is countersunk in the head 23 of the adjusting stock 21, and the head 23 fits, in an airtight manner in the cavity 17 in the bottom of the mould 2, whereby the latter is also centered. The head 23 of the adjusting stock is provided with air passages 24 which extend from cavity 17 to an annular channel 25 at the lower side of the adjusting stock, and the annular channel 25 is connected to a passage 26 in the table 1 through which compressed air can be supplied.

What we claim is:

1. A method for removing a glass article from an upwardly opening mould comprising, at a time when the glass article is still substantially plastic and only the surface of the article in contact with the mould has set, applying suction through a plate disposed a short distance above the upper edge of the article in the mould and, at the same time, introducing air under pressure between the bottom of the mould cavity and the bottom of the glass article so as to raise the latter into adhering contact with the suction plate, lifting the suction plate relative to the mould with the glass article adhered to the plate, and transporting the suction plate with the article away from the mould.

2. A device for manufacturing glass articles, comprising a mould table having a duct for compressed air, an adjusting stock on said table having an upwardly protruding central head, a glass pressing mould having an upwardly opening moulding cavity in which a glass article is shaped from a quantity of molten glass, said mould being secured to said table on top of said adjusting stock and having a downwardly opening recess tightly receiving said head, an insert in said mould between said mould cavity and said recess and defining passages for compressed air extending from said recess and opening at the bottom of said mould cavity around the axis of the latter, said adjusting stock having an annular channel in its lower surface communicating with said duct of the table and vertical bores extending from said channel and opening into said recess at the top surface of said head, and a suction plate for the removal of a glass article from the mould, said suction plate having an annular lower edge adapted to contact the edge of an article in said mould cavity and means for applying a suction at the underside of the plate within said annular edge thereof, said suction plate being vertically movable along a fixed axis, and said table being horizontally movable to and from a position where the axis of said mould cavity coincides with said axis of movement of the suction plate.

References Cited by the Examiner
UNITED STATES PATENTS

| | | | |
|---|---|---|---|
| 1,532,255 | 4/25 | Miller | 65—260 X |
| 2,584,109 | 2/52 | Blackburn et al. | 264—335 |
| 2,900,664 | 8/59 | Hampel et al. | 65—24 X |

DONALL H. SYLVESTER, *Primary Examiner.*